US008024721B2

(12) United States Patent
Matic (10) Patent No.: US 8,024,721 B2
(45) Date of Patent: Sep. 20, 2011

(54) SYSTEM AND METHOD FOR IMPLEMENTING A SAFE FRAMEWORK

(75) Inventor: Dragan S. Matic, Odenheim (DE)

(73) Assignee: SAP AG, Walldorf (DE)

( * ) Notice: Subject to any disclaimer, the term of this patent is extended or adjusted under 35 U.S.C. 154(b) by 1260 days.

(21) Appl. No.: 11/704,052

(22) Filed: Feb. 8, 2007

(65) Prior Publication Data
US 2008/0059940 A1    Mar. 6, 2008

Related U.S. Application Data

(60) Provisional application No. 60/841,708, filed on Sep. 1, 2006.

(51) Int. Cl.
*G06F 9/44*    (2006.01)
*G06F 9/45*    (2006.01)

(52) U.S. Cl. .......................... 717/163; 717/111; 717/166

(58) Field of Classification Search ........................ None
See application file for complete search history.

(56) References Cited

U.S. PATENT DOCUMENTS

| 7,184,917 B2* | 2/2007 | Pramanick et al. ........... 702/120 |
| 2008/0059940 A1 | 3/2008 | Matic |
| 2008/0071657 A1 | 3/2008 | Matic |

OTHER PUBLICATIONS

"Java ™ Platform, Standard Edition 6 Overview," [online], <http://java.sun,com/javase/6/docs/technotes/guides/index.html>, retrieved on Jun. 1, 2007, pp. 1-10.
"JDK™ 6 Documentation", [online], <http://java.sun.com/javase/6/docs/#guide>, retrieved on Jun. 1, 2007, pp. 1-4.

* cited by examiner

*Primary Examiner* — Chuck O Kendall
(74) *Attorney, Agent, or Firm* — Fish & Richardson P.C.

(57) ABSTRACT

This disclosure provides various embodiments of software for implementing a safe framework for application development. In one aspect, the software initializes an application using a runtime framework, identifies a customized class residing in a library associated with and decoupled from the runtime framework, identifies a path to the customized class residing in the library, and automatically loads the class to run the application. In some implementations, the customized class may comprise a distinct version of a standard class from the standard library. In still other implementations, the software may selectively identify a customized class or a standard class, identify a path to the selectively identified class, and automatically load the selectively identified class.

20 Claims, 3 Drawing Sheets

SYSTEM AND METHOD FOR IMPLEMENTING A SAFE FRAMEWORK

RELATED APPLICATION

This application claims the priority under 35 U.S.C. §119 of Provisional Application Ser. No. 60/841,708, filed Sep. 1, 2006.

TECHNICAL FIELD

This invention relates to application development and, more particularly, to systems and methods for implementing a safe framework for business applications.

BACKGROUND

In software development, a framework is generally considered a defined support structure in which other software projects may be organized and developed. A framework may include support programs, code libraries, a scripting language, or other software to help develop and piece together the various components of a software project. By bundling a large amount of reusable code into the framework, developers may save time by inserting reusable solutions into their applications instead of rewriting standard lines of code. An example framework may be or include a Java environment. In the Java framework, a program is partially compiled and the result of this compilation is called "byte code". Due to the partial compilation, an interpreter such as the Java Runtime Environment (JRE) may be used in order to interpret byte code and execute the program.

Before a Java class is executed, the class is "loaded" into the memory through the use of a "ClassLoader." The ClassLoader first finds the file containing or referencing the class to be loaded. Upon locating the class, the files are stored in the memory as either separate files or packed in a Java Archive (JAR) file. Normally, the framework will first execute the JAR file, which triggers the particular application in some manner. The ClassLoader may require information as to the plurality of paths to files containing the byte code as well as paths to the framework of the application. The paths may be provided at the start of the process through a variety of methods. For instance, they may be provided in an environmental variable, handled by the framework entry point, or another known method.

The location of a set of JAR files or of separate compiled Java classes may be defined as a "library." For example, the libraries in a Java environment may be logically separated into three groups: (1) a system library containing java classes of the JRE; (2) a framework library associated with the framework; and (3) an application library associated with the specific application. The framework may handle the list of JAR files itself and implement its own ClassLoader. In other implementations, the JAR files may be handled by the application, by the system, or by an external method or batch file, each providing its own ClassLoader for performing the necessary loading functions.

Generally, most application developers do not have a direct influence on the framework through which the application is developed or deployed. One reason for limiting an application developer's ability to modify a framework is that upgrades to the framework usually cannot be made without effecting enhancements to the applications being developed therewith, including those developed by other developers who rely on the current state of the framework for successful development. As such, application developers may not be provided with permissions to modify the framework library. However, in certain situations, changes to the framework are necessary in order to get the application to run as desired. Using current solutions, allowing changes to the framework by the application developer may cause environment-wide modifications to the framework and all applications relying thereupon. Identifying and notifying the appropriate developers, as well as modifying the framework in a manner such that environment-wide alterations are made, is often a difficult and time-consuming task. Accordingly, current framework modifications can lead to dysfunction and/or regression to the enhancements of the applications created and run within the framework.

SUMMARY

This disclosure provides various embodiments of software for implementing a safe framework for application development. In one aspect, the software initializes an application using a runtime framework, identifies a customized class residing in a library associated with and decoupled from the runtime framework, identifies a path to the customized class residing in the library, and automatically loads the class to run the application. In some implementations, the customized class may comprise a distinct version of a standard class from the standard library. In still other implementations, the software may selectively identify a customized class or a standard class, identify a path to the selectively identified class, and automatically load the selectively identified class. Additionally, the software may automatically load another class associated with the customized class when the customized class is automatically loaded.

Moreover, some or all of these aspects may be further included in respective systems or other devices for executing, implementing, or otherwise supporting a suitable software application. The details of these and other aspects and embodiments of the disclosure are set forth in the accompanying drawings and the description below. Other features, objects, and advantages of the various embodiments will be apparent from the description and drawings, as well as from the claims.

DETAILED DESCRIPTION

Figure 1:
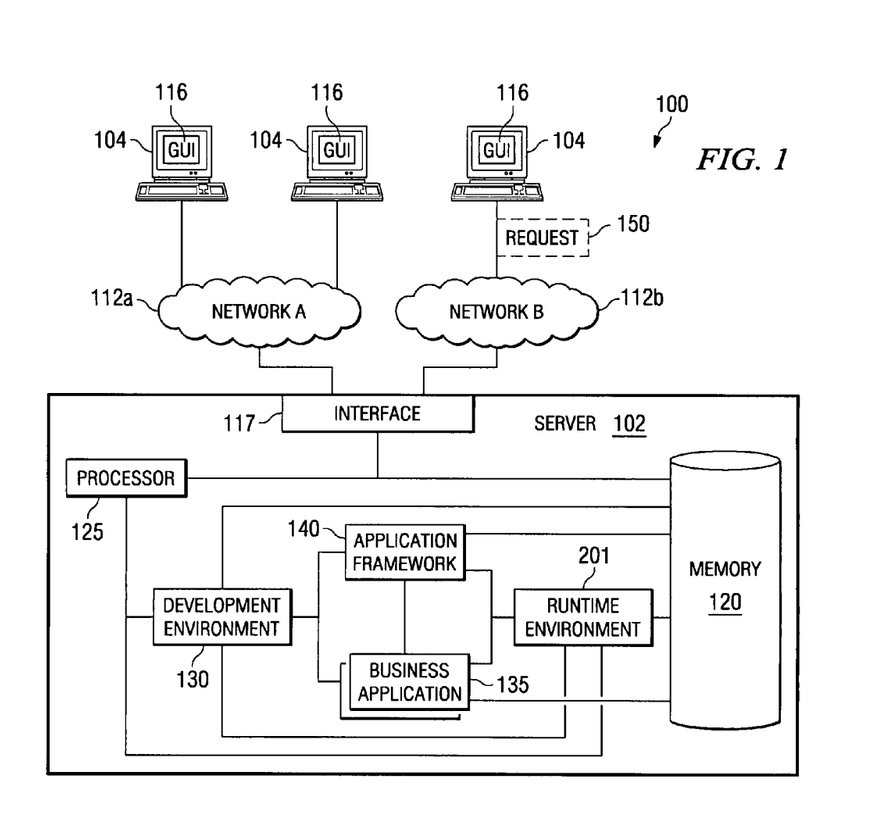
FIG. 1 illustrates an example environment implementing a safe framework according to particular implementations of the present disclosure.

FIG. 1 illustrates an environment 100 for the implementation of safe framework enhancements by application developers in at least a portion of enterprise or data processing environment. These enhancements or customizations may include code changes, parameter modifications, initialization or registry changes, or any other suitable modification, addition, or deletion that is different from the normal framework in some fashion. In accordance with particular implementations, environment 100 utilizes a system communicably coupling a development environment 130, a runtime environment 201, an application framework 140, and one or more business applications 135. These connections allow for safe enhancements to be made to the application framework 140. In certain embodiments, environment 100 provides development environment 130 communicably coupled to a business application 135, which may be stored in memory 120 and processed by one or more processors 125. The development environment 130 and application framework 140 may be applicable to a variety of programming platforms, such as Sun's Java or Microsoft's .NET. Environment 100 further allows application developers, using the development environment 130, to customize the application framework 140 without overwriting and/or losing the standard, non-customized, or otherwise existing application framework 140. For example, after the developer and/or application modifies the application framework 140, other users and/or applications (as well as the developer or application that made the initial modification) may utilize either the standard or customized application framework 140 with the current project. In other embodiments, a business application 135, the runtime environment 201, or other software may automatically select the standard or customized application framework 140 to apply based on certain provided parameters. As such, users and/or applications can modify the application framework 140 such that the original framework remains intact, thereby providing a technique for safely enhancing the framework without causing potential dysfunction and/or regression to other components relying on the original framework.

In other alternate or complimentary embodiments, environment 100 allows users and/or applications to quickly modify a portion of the application framework 140. In certain embodiments, users and/or applications may desire or need to provide certain instructions into the customized application framework. To do so, the environment 100 allows for the automatic addition of specified code into a customized framework. A customized class is identified, and through various methods, at least a portion of the identified customized class is provided into the customized application framework such that it reflects a distinct variation of the standard application framework 140. In allowing for the addition of code to the standard framework, environment 100 can provide a quick and useful method for making enhancements to the application framework 140 without users and/or applications being required to laboriously rewrite the customizations to the framework line by line for alterations common to one or more application frameworks.

In certain embodiments of environment 100, the system may include or be communicably coupled with a server 102, one or more clients 104, and a network 112. The server 102 includes memory 120 and one or more processors 125 and comprises an electronic computing device operable to receive, transmit, process, store or manage data associated with the system. Generally, this disclosure provides merely one example of computers that may be used with the disclosure. As used in this document, the term "computer" is intended to encompass any suitable processing device. For example, the environment 100 may be implemented using computers other than servers, as well as a server pool. Indeed, the server 102 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. The server 102 may be adapted to execute any operating system including Linux, UNIX, Windows Server, or any other suitable operating system. According to one embodiment, the server 102 may also include or be communicably coupled with a web server and/or a mail server.

Memory 120 may include any memory or database module and may take the form of volatile or non-volatile memory including, without limitation, magnetic media, optical media, random access memory (RAM), read-only memory (ROM), removable media, or any other suitable local or remote memory component. For example, the memory 120 may store classes, frameworks, applications, backup data, jobs, or other information that includes any parameters, variables, algorithms, instructions, rules, or references thereto. The memory 120 may also include any other appropriate data such as VPN applications, firmware logs and policies, firewall policies, a security or access log, print or other reporting files, HTML files or templates, and others.

The server 102 also includes a processor 125. The processor 125 executes instructions and manipulates data to perform the operations of the server 102 such as, for example, a central processing unit (CPU), a blade, an application specific integrated circuit (ASIC), or a field-programmable gate array (FPGA). Although described as a single processor in the server 102, multiple processors 125 may be used according to particular needs and reference to processor 125 is meant to include multiple processors where applicable. In certain embodiments, the processor 125 executes software such as a development environment 130, application framework 140, runtime environment 201, and/or one or more business application 135 or modules thereof. Regardless of the particular implementation, "software" may include software, firmware, wired or programmed hardware, or any combination thereof as appropriate. Indeed, application framework 140 and development environment 130 may be written or described in any appropriate computer language including C, C++, Java, Visual Basic, assembler, Perl, any suitable version of 4GL, as well as others.

Turning to the development environment 130, an application can be developed (created or modified) using modeling systems for example. In general, these models can specify the types of development objects or components that can be used to build applications, as well as the relationships that can be used to connect those components. In a given modeled architecture, development objects can be organized by any combination of relationships, including hierarchical relationships, grouping relationships, and the like. In an object-oriented architecture, for example, a defined application can include a combination of various data objects and resources (i.e., development objects). In that example, relationships among the development objects can include a relationship indicating that one data object inherits characteristics from another data object. Another example architecture is the model-view-controller (MVC) architecture. Applications built using the MVC architecture typically include three different types of components—models, which store data such as application data; views, which display information from one or more models; and controllers, which can relate views to models, for example, by receiving events (e.g., events raised by user interaction with one or more views) and invoking corresponding changes in one or more models. When changes occur in a model, the model can update its views. Data binding can be used for data transport between a view and its associated model or controller. For example, a table view (or a table including cells that are organized in rows and columns) can be bound to a corresponding table in a model or controller. Such a binding indicates that the table is to serve as the data source for the table view and, consequently, that the table view is to display data from the table. Continuing with this example, the table view can be replaced by another view, such as a graph view. If the graph view is bound to the same table, the graph view can display the data from the table without requiring any changes to the model or controller. In the MVC architecture, development objects can include models, views, controllers, and components that make up the models, views, and controllers. For example, application data in a model can be an example of a component that is a development object.

The development environment 130 may be an integrated environment for the development of J2EE-based, multi-tiered business applications. It may provide an open and extensible development environment using Java and Web services. Tool sets may be represented as perspectives that control the editors and views displayed, thereby allowing developers to switch quickly between perspectives to work on different tasks. Some example perspectives may include:

J2EE perspective: Can support the development and deployment of J2EE technologies such as Java Server Pages (JSPs), servlets, and EJBs;

Web services perspective: Can combine tools to define, discover, and test Web services;

Persistence perspective: Can support the creation and definition of database objects, such as tables and indexes, through the use of the Java Dictionary, editors, and standards such as SQLJ or Java Data Objects;

Debugging perspective: Can support testing of Java applications by checking metrics, conventions, authorizations, and language restrictions; and/or Java Development Infrastructure perspective: Can provide tools for organizing, tracking, and synchronizing the work of large groups of developers. The developer infrastructure manages source code, incrementally builds new versions, and deploys applications on the right server at the right time.

The development environment 130 may also support development kits that contain special tools dedicated to certain components. For example, a Mobile Development Kit may integrate tools required to help build and test mobile applications for PDAs and laptops. The development environment 130 may also include tools dedicated to constructing an application's user interface. Some kits may be language-agnostic and may support Java, ABAP, as well as other programming languages.

In another example, the development environment 130 may be the technical foundation for enterprise mobility within another development studio and provide the technology that powers composite applications for a mobile business. With this development environment 130, the business may mobilize quickly, taking advantage of existing IT infrastructure and extending tried-and-true business processes within and beyond enterprise boundaries. This example development environment 130 may comprise three mobile client technologies to enable standardized mobile business solutions as well as customer-specific developments. These clients may be optimized for specific user roles and target devices. For example, the modules may include:

Mobile Java client: Can be optimized for personal digital assisted (PDA) or handheld devices that display occasionally connected applications, such as mobile asset management;

Mobile .NET client: Can be designed for Microsoft Windows-based devices that display occasionally connected CRM field applications with a rich function set; and/or Mobile browser client: Can be designed for mobile devices that are connected to a web server using various technology.

As an integrated component of another development studio, the development environment 130 may potentially leverage the overall platform benefits. For example, mobile business may operate in both connected and disconnected modes because development environment 130 may provide a local run-time environment, employees can perform their jobs whether disconnected or connected to the systems at their main office. With solutions powered by this development environment 130, employees may store data offline on their mobile device and then synchronize information on back-end systems as needed. This development environment 130 may provide a mobile development kit that helps developers build and customize mobile solutions that are tightly integrated with the back-end system. As described above, the development environment 130 is often used for customizing or enhancing business application 135 or a related framework.

At a high level, business application 135 is any application, program, module, process, or other software that may execute, change, delete, generate, or otherwise request or implement batch processes according to the present disclosure. In certain cases, system 100 may implement a composite application 135. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET. Further, while illustrated as internal to server 102, one or more processes associated with application 135 may be stored, referenced, or executed remotely. For example, a portion of application 135 may be a web service that is remotely called, while another portion of application 135 may be an interface object bundled for processing at remote client 104. Moreover, application 135 may be a child or sub-module of another software module or enterprise application (not illustrated) without departing from the scope of this disclosure. Indeed, application 135 may be a hosted solution that allows multiple parties in different portions of the process to perform the respective processing. For example, client 104 may access business application 135, once developed, on server 102 or even as a hosted application located over network 112 without departing from the scope of this disclosure. In another example, portions of business application 135 may be developed by the developer working directly at server 102, as well as remotely at client 104.

More specifically, business application 135 may be a composite application, or an application built on other applications, that includes an object access layer (OAL) and a service layer. In this example, application 135 may execute or provide a number of application services, such as customer relationship management (CRM) systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help composite application 135 to orchestrate a business process in synchronization with other existing processes (e.g., native processes of enterprise base systems) and leverage existing investments in the IT platform. Further, composite application 135 may run on a heterogeneous IT platform. In doing so, composite application 135 may be cross-functional in that it may drive business processes across different applications, technologies, and organizations. Accordingly, composite application 135 may drive end-to-end business processes across lo heterogeneous systems or sub-systems. Application 135 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes the composite application 135, it may instead be a standalone or (relatively) simple software program. Regardless, application 135 may also perform processing automatically, which may indicate that the appropriate processing is substantially performed by at least one component of system 100. It should be understood that this disclosure further contemplates any suitable administrator or other user interaction with application 135 or other components of system 100 without departing from its original scope. Finally, it will be understood that system 100 may utilize or be coupled with various instances of business applications 135. For example, client 104 may run a first business application 135 that is communicably coupled with a second business application 135. Each business application 135 may represent different solutions, versions, or modules available from one or a plurality of software providers or developed in-house.

The processor can also execute the application framework 140, which generally unifies portions of software code to reduce development efforts, code maintenance, and operation between multiple versions of business application 135 and/or various disparate applications 135 at runtime. The framework 140 may facilitate process logic functionality as well as business logic functionality for an application such as the business application 135. For example, the framework 140 may allocate the data services according to requests received from the application 135. The data services may include one or more business objects (not pictured) that provide one or more pieces of data to the application 135 by, for example, performing an operation utilizing data from the application 135 or providing one or more pieces of data to the application 135. For example, the application 135 may require a report on all open sales invoices. As a result, the application 135 may send a request to one of the business objects that is configured to search through a compilation of the sales invoices and determine which of the invoices are open. The framework 140 may facilitate transmittal of the results back to the client 104. Consequently, the framework 140 may facilitate communications with the application 135. In certain cases, the framework 140 may be further operable to perform other types of processing or include links to such other functionality. For example, illustrated application framework 140 generally includes both the original framework and the enhanced or customized portions. In some embodiments, the environment 100 includes a runtime environment 201 that is communicably coupled to one or both of development environment 130 and application framework 140. Runtime environment 201 can consist of a virtual machine state that provides software services for processes while the business application 135 (and perhaps application framework 140) is running.

Returning to the example server 102, the server may also include an interface 117 for communicating with other computer systems, such as the clients 104, over the network 112 in a client-server or other distributed environment. Generally, the interface 117 comprises logic encoded in software and/or hardware in a suitable combination and operable to communicate with the network 112. More specifically, the interface 117 may comprise software supporting one or more communications protocols associated with communications such that the network 112 or hardware are operable to communicate physical signals.

The network 112 facilitates wireless or wireline communication between the server 102 and any other local or remote computer, such as the clients 104. Indeed, while illustrated as two networks, 112a and 112b respectively, network 112 may be a continuous network without departing from the scope of this disclosure, so long as at least a portion of network 112 may facilitate communications between senders and recipients of requests 150 and results. The network 112 may be all or a portion of an enterprise or secured network. In another example, the network 112 may be a virtual private network (VPN) merely between the server 102 and the client 104 across wireline or wireless link. Such an example wireless link may be via 802.11a, 802.11b, 802.11g, 802.20, WiMax, and many others. In other words, the network 112 encompasses any internal or external network, networks, sub-network, or combination thereof operable to facilitate communications between various computing components in the system. The network 112 may communicate, for example, Internet Protocol (IP) packets, Frame Relay frames, Asynchronous Transfer Mode (ATM) cells, voice, video, data, and other suitable information between network addresses. The network 112 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, the network 112 may be a secure network associated with the enterprise and certain local or remote the clients.

The client 104 is any computing device operable to connect or communicate with the server 102 or the network 112 using a wireline or wireless connection. At a high level, each client 104 includes at least the GUI 116 and, in some cases, an agent and comprises an electronic computing device operable to receive, transmit, process and store any appropriate data associated with the backup system. It will be understood that there may be any number of the clients 104 communicably coupled to the server 102. For example, the clients 104 may include one local client and two external clients to the illustrated portion of the network 112. Further, "the client 104," "developer," and "user" may be used interchangeably as appropriate without departing from the scope of this disclosure. Moreover, for ease of illustration, each client 104 is described in terms of being used by one user. But this disclosure contemplates that many users may use one computer or that one user may use multiple computers. As used in this disclosure, the client 104 is intended to encompass a personal computer, touch screen terminal, workstation, network computer, kiosk, wireless data port, smart phone, personal data assistant (PDA), one or more processors within these or other devices, or any other suitable processing device. For example, the client 104 may comprise a computer that includes an input device, such as a keypad, touch screen, mouse, or other device that can accept information, and an output device that conveys information associated with the operation of the server 102 or the clients 104, including digital data, visual information, or the GUI 116. Both the input device and output device may include fixed or removable storage media such as a magnetic computer disk, CD-ROM, or other suitable media to both receive input from and provide output to users of the clients through the display, namely the GUI 116.

GUI 116 comprises a graphical user interface operable to, for example, allow the developer to interact in a development environment 130; or the user of the client 104 to interface with at least a portion of environment 100 for any suitable purpose. Generally, the GUI 116 provides the particular user with an efficient and user-friendly presentation of data provided by or communicated within the system. The GUI 116 may comprise a plurality of customizable frames or views having interactive fields, pull-down lists, and buttons operated by the user. The GUI 116 is often configurable, supports a combination of tables and graphs (bar, line, pie, status dials, etc.), and is able to build real-time dashboards, where tabs are delineated by key characteristics (e.g. site). The GUI 116 is further operable to generate or request historical reports. Generally, historical reports provide critical information on what has happened including static or canned reports that require no input from the user and dynamic reports that quickly gather run-time information to generate the report. Therefore, the GUI 116 contemplates any graphical user interface, such as a generic web browser, touch screen, or command line interface (CLI) that processes information in environment 100 and efficiently presents the results to the user. The server 102 can accept data from the client 104 via the web browser (e.g., Microsoft Internet Explorer or Mozilla Firefox) and return the appropriate HTML or XML responses using the network 112. The client 104 may also include, reference, or execute an agent to assist in data gaming. The agent may be any script, library, object, executable, service, daemon, or other process.

Figure 2:
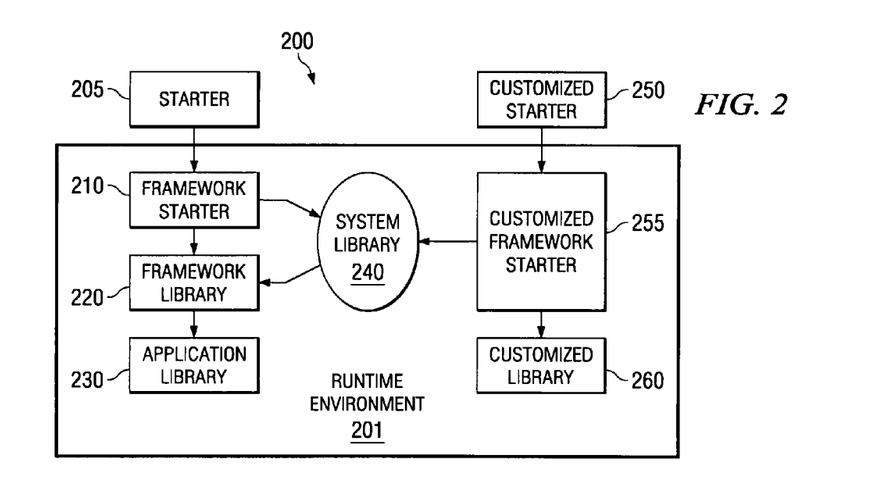
FIG. 2 is a diagram illustrating an example technique for implementing a safe framework in the illustrated environment of FIG. 1.

FIG. 2 is a block diagram of a more detailed example of the runtime environment 201 working with a safely enhanced framework. System 200 as illustrated in FIG. 2 is only one example of the environment 100 described by this disclosure and other implementations or configurations are possible. System 200 illustrates the environment 100 after a user and/or application enhances the standard framework to create a distinct, customized framework. In this example, prior to the creation of the customized framework, only the framework starter 210, framework library 220, application library 230, and system library 240 are present within the runtime environment 201, with starter 205 located external to the runtime environment 201. To create the customized framework, customized starter 250 is created external to the runtime environment 201, and customized framework starter 255 and customized library 260 are created within the runtime environment 201.

As described above, runtime environment 201 can represent a virtual machine state that provides software services for processes or programs while a computer is running. It may pertain to the operating system itself, or the software that run beneath it. In most cases, the operating system handles loading the program with a piece of code called the loader, doing basic memory setup and linking the program with any dynamically linked libraries it references. In some embodiments, a language or implementation may have these tasks done by the language at runtime instead. For example, runtime environment 201 may comprise or implement the JRE, Microsoft's .NET runtime environment, or any other suitable runtime environment.

Returning to FIG. 2, prior to any developer enhancements, the environment 100 contains starter 205 external to the runtime environment 201. The starter 205 calls a class that may use the system library 240 in order to load classes into memory 120 to let the framework start and, through some mechanism, start a particular application. Starter 205 may be a batch file which, for example, sets at least one environment parameter and triggers the framework starter 210 of a specified library. In other examples, starter 205 may be an external application, method, or other suitable device, capable of performing the same functions as a batch file, such as setting environmental parameters and triggering the framework starter 210.

As described above, three types of libraries may be present within the application framework. The framework library 220 represents the classes associated with the framework itself. This library is typically unable to be modified by the application developer. The application library 230 represents the classes associated with the application being executed in the runtime environment 201. This library may be defined by the application developer and enables the application to perform a specific task or method. In some examples, multiple application libraries 230 may be present within system 200. Finally, the system library 240 contains the classes inherent to the runtime environment 201. The system library 240 provides those classes common to a certain programming platform such as, for example, Java or .NET.

Framework starter 210 may be another batch file, external application, method, or other suitable device within the runtime environment 201. Upon being triggered by starter 205, framework starter 210 may register the paths to desired classes. For example, the desired classes may be those classes required to perform the specific application associated with the framework and starter 205. The framework starter 210 may register the paths by providing the path definition to the system through its internal code. The path definition may be defined by including a string containing the location of the class within the framework starter 210, providing a variable in the code referencing the location of the class, or by any other suitable method.

At some point during runtime, classes may be needed by the business application 135. At that time, a class loader may be called to follow the paths defined by framework starter 210 such that class loader may find and subsequently load the class into memory 120. Upon loading into memory 120, the class may be executed when called by the application. Different runtime environments 201 provide different types of class loaders. One example of the class loader in a programming environment is the Java object ClassLoader. Regardless of the programming language or platform, the class loader runs such that it follows the paths set out by the framework starter 210 in search of the desired class. The class loader will either find the desired class or return an exception to the user and/or application stating that the desired class could not be found.

The connections between the libraries (system 240, framework 220, and application 230) of the runtime environment 201 may cause the search for the desired class to occur in a hierarchical manner beginning with the framework library 220. If the class loader fails to locate the class there, the search continues to the application library 230. If again the class loader fails to find the desired class, the class loader searches the system library 240 for the desired class. If after searching the system library 240 the desired class cannot be found, an exception is thrown providing the user and/or application with notice that the desired class is not located in the libraries searched.

Further, application developer can safely create or modify a customized framework such that necessary changes may be made to a standard framework while avoiding the enterprise-wide changes required by current methods. The developer, using the tools and functionality of the development environment 130, may take an existing framework library 220 and modify the classes and class structure therein to complement the design of his application. Instead of storing the changes to the framework library 220 within itself, a new library may be created named customized library 260 wherein changes to the standard framework library 220 may be stored. In this manner, previously created applications and those currently under development in the runtime environment 201 will not be affected by the enhancements performed by the application developer.

When the customized library 260 is first created, two corresponding elements may also be created: customized starter 250 and customized framework starter 255. Similar to starter 205, customized starter 250 may be located external to the runtime environment 205, and may be a batch file, external application, method, or other suitable device for performing specific functions such as setting environment parameters and triggering the customized framework starter 255. The customized starter 250 provides an entry point into the runtime environment 201 for applications 135 requiring the use of the customized framework. For those applications 135 utilizing the standard framework, the correct entry point remains starter 205. In this manner, either the standard or customized behavior may be obtained by selectively initiating the process through starter 205 or customized starter 250.

Customized framework starter 255, like framework starter 210, may be a batch file, external application, method, or other suitable element within the runtime environment 201. After being triggered by customized starter 250, customized framework starter 255 registers the paths of desired classes. Like framework starter 210, customized framework starter 260 may register paths to the desired classes by providing the path definitions within its code, including using a string containing the location of the class, providing a variable in the code referencing the location of the class, or by any other suitable method. The primary difference between customized framework starter 255 and framework starter 210 is the path location specified. The first location specified by the customized framework starter 255 may be the customized library 260. In contrast, the first location specified by the standard framework starter 210 may be the framework library 220. The other path locations may be determined by the customized framework starter's 255 connection to the system library 240 as shown in FIG. 2. System library 240 has subsequent connections to the standard framework library 220 and the application library 230. As such, paths contained in the customized framework starter 255 may include classes located in the standard framework library 220, the application library 230, or the system library 240. However, if the specified class is found within the customized library 260, the other libraries are generally not be searched.

Again, at some point during runtime, original or customized classes may be utilized by the application 135. At that time, a class loader may be called to follow the new paths defined by customized framework starter 255 such that the class loader may find and subsequently load the desired classes into memory 120 or the old paths defined by the framework starter 210. Upon being loaded into memory 120, the class may be executed when called by the application. For example, the connections of the customized framework starter 255 help ensure that the first location for the class loader to search will be the customized library 260. Once there, the class loader may either find the desired class or continue the search in the standard framework library 220. In some implementations, the customized library 260 may store only the modifications made to standard framework library 220. In those cases, unchanged classes may be stored within the standard framework library 220 and, thus, included within the search parameters. If the class is not found there, the search continues on in a manner similar to the standard example by searching next through the application library 230. If the class is again not found, the search may continue through the system library 240. If after searching all libraries the class cannot be found, an exception may be thrown to provide the user and/or application notice that class could not be found.

Different applications 135 and frameworks 140 may provide different parameters and priorities such that the order of the libraries searched may differ. For instance, some implementations may perform the search in the following order: system library, framework library, and finally, application library. Additionally, libraries other than those listed may be included within the search in certain implementations.

Figure 3:
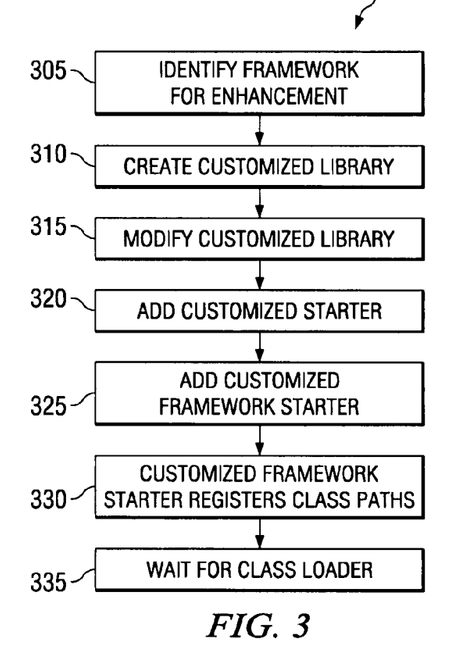
FIG. 3 is a flowchart diagram illustrating an example of the steps for creating a customized library and starter as utilized by the illustrated environment of FIG. 1.

FIG. 3 is a flowchart diagram illustrating an example embodiment of the process 300 for creating the customized framework. The following description of the flowchart illustrating process 300 focuses on the operation of the development environment 130, or its components or sub-modules, for modifying the standard framework to create a customized and safe framework. But environment 100 contemplates using any appropriate combination and arrangement of logical elements implementing some or all of the described functionality.

At step 305, the user and/or application working in the development environment 130 acts to identify the runtime framework 140 (or portion thereof) that will be customized. As mentioned above, in certain instances an application developer identifies changes to be made to framework 140 in order to get a particular program to run correctly. This need may arise if certain conflicts exist between the framework and the application version, if the framework is not compatible with this version or for any reason the standard framework is insufficient for the application developer. The framework 140 to be customized may be identified prior to creating the customized library 260 so that the storage location of the new library may be set.

Once the framework 140 to be enhanced has been identified in step 305, a customized library 260 is defined to the user's and/or application's requirements at step 310. In some implementations, the customized library 260 may be a copy of the standard framework library 220 stored in a separate and decoupled location such that modifications may be freely enacted. In still other implementations, only the new classes and portions of the standard class requiring modification may be stored within the customized library 260. In those implementations, the standard framework library 220 can remain a primary repository of the classes associated with the framework and only completely new classes added by the developer and modified standard library classes may be stored in the customized library 260. There, the class loader in FIG. 2 may consistently find desired classes within the framework library 220.

After creation (or other identification) of the new library in step 310, the user and/or application perform the required modifications to desired classes located in the customized library 260 at step 315. At this step, the changes that have been requested by the application developer may be implemented such that the application being developed may run appropriately with the application framework 140. Modifying the customized library 260 may include adding new classes to the library, rewriting elements within preexisting classes, adding methods and functions to preexisting classes, or other suitable modifications as required. When the modification of the customized library 260 is complete, process 300 moves to step 320.

At step 320, the customized starter 250 is created or suitably modified if appropriate. In some implementations the customized starter 250 may be written similar to starter 205 with a principal distinction in that customized starter 250 triggers customized framework starter 255 as compared to starter 205 triggering framework starter 210. In other implementations, the customized starter 250 may be created in a form different than that of starter 205. For instance, where starter 205 may be written as a batch file, customized starter 250 may be created as an external application or another suitable element other than a batch file. Regardless of the form customized starter 250 may be created in, the effect of the object, whether directly or indirectly, may be to trigger the customized framework starter 255 as opposed to the standard framework starter 210.

Once step 320 is complete, process 300 adds the customized framework starter 255 to the runtime environment 201. In some implementations, the customized framework starter 255 may be created in a similar manner as framework starter 210. In still other implementations, the customized framework starter 255 may be defined in a manner distinct from standard framework starter 210. Regardless of their structural similarity, the primary dissimilarity between the two may be that the customized framework starter 255 specifies the customized library 260 as the primary path for class searching by the class loader, whereas framework starter 210 specifies framework library 220 as the primary class. If during the search customized framework starter 255 does not find the desired class in the customized library 260, a search pattern similar to the standard framework starter 210 may be followed (framework library 220 to application library 230 to system library 240 to thrown exception.)

At step 330, the customized framework starter 255 may register the paths of the desired classes with the system such that a class loader may, in the future, find and load the desired classes into memory 120. As described above, customized framework starter 255 may provide path definitions by including a string containing the location of the class, providing a variable in the defining code referencing the location of the class, or by any other suitable method for providing such information. Once these steps are complete, step 335 of process 300 may allow the system to wait for when a class is required by the application, wherein a class loader is called in an attempt to find and load the desired class into memory 120.

Figure 4:
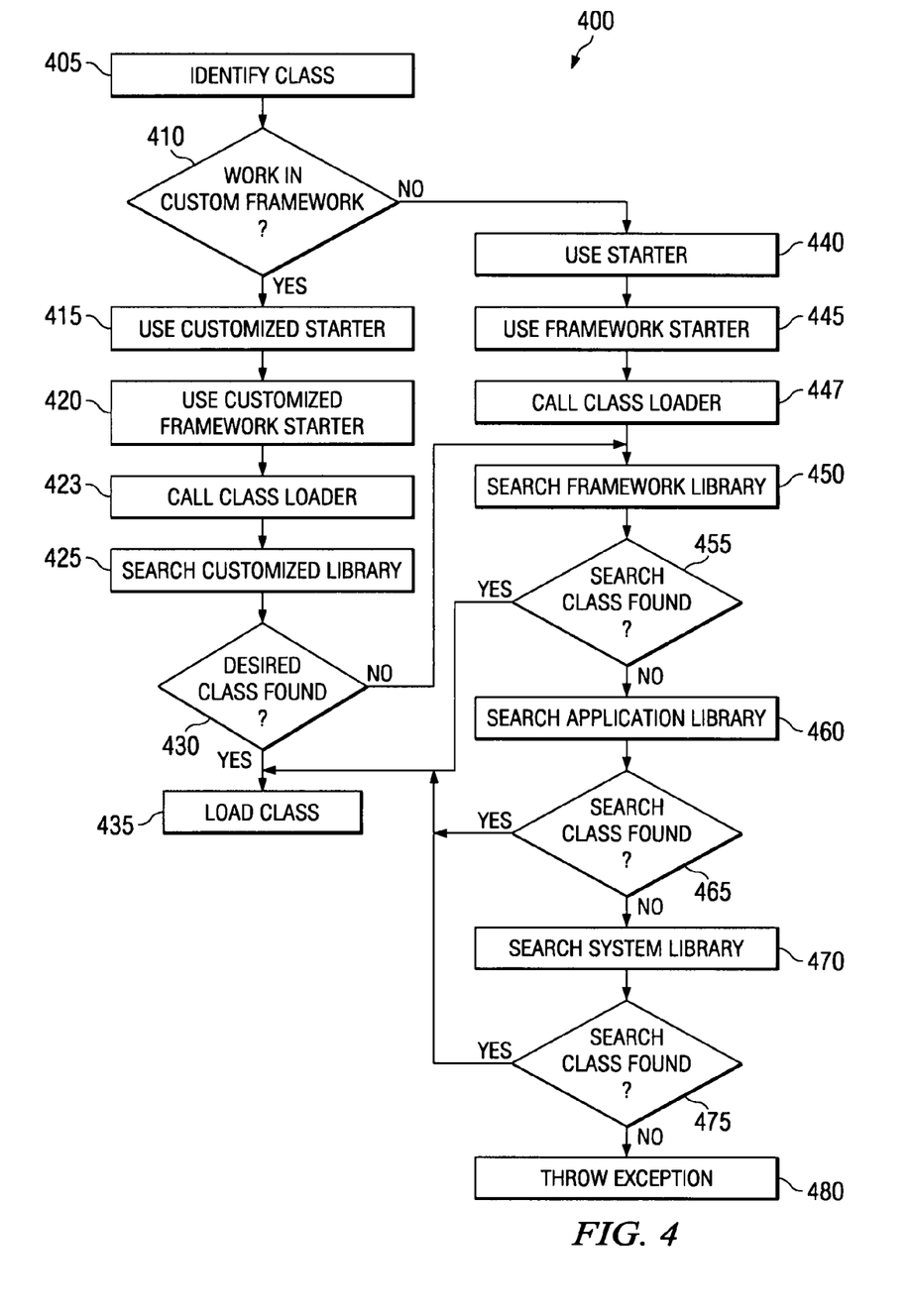
FIG. 4 is a flowchart diagram illustrating an example of the steps for loading a class within the illustrated environment of FIG. 1.

FIG. 4 is a flowchart diagram illustrating an example process 400 for loading a desired class using the safe framework enhancement. The following description of the method 400 focuses on the operation of the application framework 140, or its components or sub-modules. Environment 100 contemplates using any appropriate combination and arrangement of logical elements implementing some or all of the described functionality. As described in FIGS. 2 and 3, a customized starter 250, customized framework starter 255, and customized library 260 are utilized in certain embodiments of the environment 100 of FIG. 1.

At step 405, a class that the particular application utilizes at runtime is identified using any suitable criteria, parameters, or logic. Once the class is identified, process 400 moves to decision 410 of whether the customized framework should be loaded. This decision may be based on a number of factors, such as whether the current application developer created the customized framework, whether the current application is designed to only the use of the standard framework, or other factors defined within the application framework 140. For example, the decision could be made by code running within the framework, on the selection of a related business application 135 associated with the framework, by parameters provided by a client 104 through network 112, or through various other techniques.

If the application 135 is to work with the customized (or otherwise adapted) framework 140, method 400 proceeds to step 415 and uses the customized starter 250 as an entry point into the runtime environment 201. As described above, customized starter 250 may present one or more environmental variables to the runtime environment 201 as well as trigger the associated customized framework starter 255. At step 420, the customized framework starter 255 may then perform its associated functions, including the registration of class paths with the runtime system. In registering the class paths, the customized library 260 may be defined as the initial path for the class loader when it is called. Following the customized library 260 in the search paths may be paths to the framework library 220, the application library 230, and the system library 240. By registering the libraries in this order, the customized framework starter 255 may ensure that classes modified in the customized framework, but which retained identical names to the classes in the standard framework, are the classes returned and loaded by the class loader.

Once the registration of paths is complete, step 423 calls and initiates class loader. This call may be performed immediately after the registration of paths from step 420, or alternatively, an amount of time may pass before the runtime environment 201 requires a class to be run. When the runtime environment 201 does require a class, the class loader may be initialized at step 423. Upon its call, the class loader may follow the paths registered by the customized framework starter 255 in its search for the desired class. At step 425, the class loader initially searches through the customized library 260. After completing a search of customized library 260, step 430 decides whether the desired class has been located. If the particular class has been located, then the class loader may proceed to step 435, where the class loader may load the desired class into memory 120 and complete method 400. Otherwise, the process proceeds to step 450 to search the framework library 220.

At step 450, the class loader performs a similar search of the framework library 220. If the desired class is located within the framework library 220, the process 400 proceeds to step 435 wherein the class loader loads the desired class into memory 120 such that the runtime environment 201 may perform the methods defined within the desired class. If the particular class is not been located, method 400 continues to step 460 where the class loader may search the application library 230.

The search of the application library 230 at step 460 may be similar to the previous searches by the class loader of the customized library 260 and the framework library 220. If the desired class is located within the application library 230, then illustrated method 400 returns to step 435 where the class loader may load the desired class into memory 120. If not located, the method 400 continues the search through the paths registered by the customized framework starter 255, moving method 400 on to search the system library 240 at step 470.

A search by the class loader of the system library 240 can occur at step 470 similar to the previous searches in steps 425, 450, and 460. If the desired class is found, illustrated method 400 proceeds to step 435 where the class loader acts to load the class into memory 120. In this embodiment, the registered paths provided by the customized framework starter 255 end after the system library 240. As such, if the desired class is not found, no more paths have been specified and the desired class has not been found. In that case, step 480 may throw an exception in the runtime environment 201 indicating that the desired class cannot be found. In this embodiment, method 400 for loading a desired class may end either in the class being loaded by the class loader in step 435 or in an exception being thrown in step 480 indicating that the desired class is not found.

Returning to decision 410, if the customized library 460 (or portion thereof) is not to be utilized in the current situation, then method 400 proceeds to step 440 where starter 205 is provided as the entry point into the runtime environment 201. Starter 205 may trigger the framework starter 210, provide environmental variables to the runtime environment 201, and perform other related tasks. At step 445, the framework starter 210, triggered by starter 205 at step 440, performs functions according to its programming, including registering class paths within the runtime environment 201 for classes required within the standard, non-customized framework. In this standard framework, the path registration may provide the framework library 220 as the initial library for searching. In this manner, the customized library 260 identified for the customized framework may be ignored by applications applying the standard framework.

After executing the framework starter 210, the class loader may be called in step 447. Calling the class loader in step 447 may be done immediately following the execution of framework starter 210, or the class loader may not be called until the one or more applications 135 utilizes a class to be loaded. When a class is required, the class loader may be initialized and the libraries within runtime environment 201 may be searched for the desired class. The search process for the class loader begins in the framework library 220 at step 450. Framework library 220 may be the initial path registered by the framework starter 210 in step 445 because in the standard framework, classes from the customized library 415 are typically unnecessary and, thus, any changes to the standard framework by application developers can be ignored. Beginning at step 450, the search for and loading of desired classes in the standard framework are similar to the procedures for the customized framework described above. Method 400 may search the paths registered by the framework starter 210, loading the desired class into memory 120 if the class is found in one of the associated libraries. If the desired class is not found in the registered search paths, an exception may be thrown in step 480 to alert the user and/or application.

As mentioned above, different applications and frameworks may have different parameters and priorities such that the search order of the libraries may differ. For instance, some implementations may perform the search of customized library 260 (where applicable), system library 240, framework library 220, and then application library 230. Additionally, libraries other than those listed may be included within the search in certain implementations.

Figure 5:
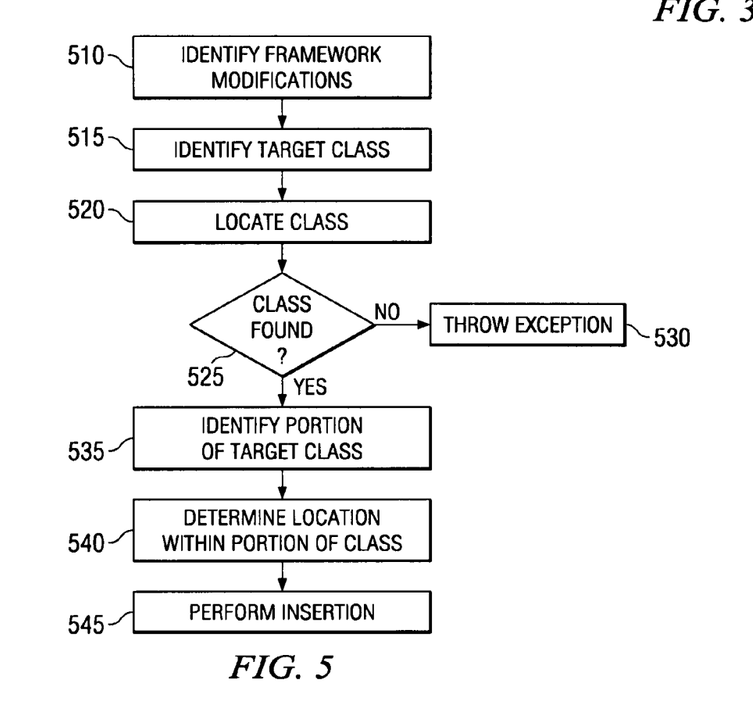
FIG. 5 is a flowchart diagram illustrating an example of the steps for inserting a portion of a customized class into a framework within the illustrated environment of FIG. 1.

FIG. 5 is a flow chart diagram illustrating another exemplary method 500 for safely enhancing one or more frameworks 140 in a repeatable manner. In the present embodiment, method 500 may use a runtime environment 201 providing for common language runtime, wherein byte codes run in an internal language (IL) format. Two examples of platforms using byte code are the Java and .NET platforms. Other platforms using byte code or non-byte code formats may implemented using variations of method 500 illustrated in FIG. 5.

After creating the enhanced framework, the issue of creating a useable and repeatable method for enhancing frameworks may be necessary. One method of modifying multiple frameworks 140 in a repeatable manner is using a scripting process within the runtime environment 201 to update the programming code defining the current framework. If the framework is defined in a Java-based environment, for instance, changes may be made to the framework byte code. Altering Java byte code using a scripting language is known in the art as "byte code weaving" or "weaving" for short. For example, the developer may use the Byte Code Engineering Library (BCEL-Technology) in order to alter the Java byte code and perform the weaving function. Programming platforms other than Java may also provide methods of modifying the framework code through changes to the underlying code which defines the framework. In method 500, the weaving script may be the process by which a piece of code that should be added, modified, or deleted for a desired class is defined. In the current implementation, an example script may be represented by the following form:

<what> <whereon> [<use>] [<return value>] [<location>]

Details regarding the structure of the individual items within this script form will be described below. Alternative forms, however, may also be used to perform the functions in method 500. For example purposes only, the code described below will be described for a Java environment.

At step 510, the user and/or application interacting with the application framework 140 identifies the changes to the framework that are desired. These changes may represent enhancements and upgrades to the framework that are wanted and/or required by the application developer. In some situations, the application in development requires certain framework enhancements in order to perform as required. Using the script form example above, the changes to be made may be represented by the <what> portion of the script. This may be a command telling the script what must be done to change the current application framework 140 into one usable for developing the application. For example, the <what> portion of the script may be represented by either instanceCall or staticCall. In some implementations, enhancements may have previously been made to other frameworks 140. In some environments 100, application developers may desire similar modifications in the current application framework 140. If that is the case, the framework modifications identified may be the same as those inserted in other frameworks, or slight variations thereupon. In those cases, the script item <what> may include portions of code that were used previously for enhancing other frameworks.

Continuing on to step 515, the developer and/or application identifies a target class, inside which the changes of step 510 are to be made. In the current example, the target class for the enhancements may be located within the framework library 220, the customized library 260, or another library within the framework. The class specified may be automatically selected by the development environment 130 according to the changes identified in step 510, or a manual selection may be made by the user and/or application. Once a class has been specified for enhancement, method 500 proceeds to step 520.

At step 520, the class loader may be called by the runtime environment 201 to load the desired class into memory 120 for use at runtime. The class loader, as in the flow chart of FIG. 4, will search those classes registered by the standard or customized framework starters for the target class. At step 525, it may be determined whether the desired target class was successfully located. If the class cannot be found, method 500 proceeds to step 530 where an exception may be thrown to notify the runtime environment 201 that the desired class cannot be found. However, if the desired target class is found at step 525, method 500 proceeds to step 535.

At step 535, a portion of the class identified in step 515 may be designated for enhancement. In one example, the portion to be updated may be a method within the desired class. In other examples, the portion of the class to be enhanced may be any element of the desired class such as fields, type descriptors, or other class elements. In situations where the class element to be updated is a method, a complete target for the selected enhancement includes the names of the package, class, and method to be modified. Thus, if a method is to be modified and the platform of the development environment 130 is Java, one example script <whereon> portion may be defined by the following code:

```
Package "standardPackage"
Class "FwkBridge"
Method "getInstance".
```

In some instances, the script for updating the target class may include the use of the optional <use> item. The <use> item provides the script with the opportunity to nest additional instructions within the basic script. One method of applying the <use> item may be to insert a variable in the <use> position. The variable provided may be defined as a previous call result. If the variable is used as such, a cascading declaration may occur, in effect calling multiple updates using the simple update declaration described above. An example in script form of this cascading declaration may result in the following:

```
<what> <whereon> {<what> <whereon> [<use>] [<return value>]
[<location>]}[<return value>] [<location>].
```

Thus, variables declared as previous or other calls within the <use> position provides for a cascading mechanism in which multiple portions of the desired class may be updated within a single script. In other examples, the <use> item may refer directly to a method or other element located within or without the target class. In such situations, the <use> item may be applied to perform other previously defined functions within the framework enhancement. The inclusion of a <use> item may be included with the identification of the portion of the class to be updated in step 535. Additionally, the <return value> item may optionally be used to return a value after a command is run as defined by step 535. In some situations, a command may not return any values after performing an enhancement.

After completing the identification of the portion being updated, method 500 determines the location within the target for the enhancement at step 540. The enhancement may be inserted within the target as defined by the enhancement script of method 500. Depending on the needs of the application developer and the requirements of the framework, the update may be inserted at the top or bottom of the target, or somewhere in between. For instance, if the structure of a class element is known, the <location> specified may be prior to, after, or inside of a declaration of a local variable, a call to a given method, or any known portion of the class element. The exact location of the enhancement may be determined according to specific requirements of the user and/or application, the preference of the user and/or application, or any other relevant determining factors.

Once the elements of the script are defined, method 500 proceeds to step 545 to perform the enhancement on the target. In many instances, the parameters of the update may result in complex coding for modifying the application framework 140. In those situations, variables may be designed to encompass various portions of the script form defined above. By defining the calls through the use of variables, the programming code for the actual execution of the updates may be written in an easy-to-understand syntax, avoiding unnecessary confusion for the application developer and other system users.

While the preceding flowcharts and accompanying descriptions illustrate exemplary processes 300, 400, and 500, environment 100 contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, environment 100 may use methods with additional steps, fewer steps, and/or different steps, so long as the process remains appropriate.

Although this disclosure has been described in terms of certain embodiments and generally associated methods, alterations and permutations of these embodiments and methods will be apparent to those skilled in the art. Accordingly, the above description of example embodiments does not define or constrain the disclosure. Other changes, substitutions, and alterations are also possible without departing from the spirit and scope of this disclosure, and such changes, substitutions, and alterations may be included within the scope of the claims included herewith.

What is claimed is:

1. Software comprising instructions stored on a computer readable medium, the software operable when executed to:
   receive a request for a class associated with an application executing in a runtime framework, where the request is received via a customized framework starter associated with at least one customized library;
   identify a customized library storing at least one customized class associated with the application, where each customized class comprises a modified version of a standard class associated with the runtime framework, and wherein the customized library is associated with and decoupled from the runtime framework;
   identify a path to a customized class residing in the customized library when the customized class corresponding to the requested class is included in the customized library; and
   automatically load the customized class corresponding to the requested class to implement the application using the runtime framework.

2. The software of claim 1, wherein the customized class comprises a distinct version of the standard class.

3. The software of claim 1 further operable when executed to:
   identify a path to the standard class residing in a standard library associated with the runtime framework when the customized class corresponding to the requested class is not included in the customized library; and
   automatically load the standard class corresponding to the requested class to implement the application using the runtime framework.

4. The software of claim 1 further operable when executed to:
   selectively identify one of the customized class or standard class;
   identify a path to the selectively identified one of the customized class or standard class; and
   automatically load the selectively identified one of the customized class or standard class.

5. The software of claim 1, wherein the runtime framework comprises a Java Runtime Environment.

6. The software of claim 1, wherein the customized library contains more than one customized class.

7. The software of claim 1 further operable when executed to return an exception if the customized class corresponding to the requested class cannot be located in the customized library.

8. The software of claim 1 further operable when executed to automatically load at least one other class associated with the customized class when the customized class is automatically loaded.

9. A system for implementing safe framework enhancements comprising:
   memory storing one or more business applications and an application framework; and
   one or more processors operable to:
      receive a request for a class associated with an application executing in a runtime framework, where the request is received via a customized framework starter associated with at least one customized library;
      identify a customized library storing at least one customized class associated with the application, where each customized class comprises a modified version of a standard class associated with the runtime framework, and wherein the customized library is associated with and decoupled from the runtime framework;
      identify a path to the customized class residing in the customized library when the customized class corresponding to the requested class is included in the customized library; and
      automatically load the customized class corresponding to the requested class to implement the application using the runtime framework.

10. The system of claim 9, wherein the customized class comprises a distinct version of the standard class.

11. The system of claim 9, wherein the one or more processors are further operable to:
   identify a path to the standard class residing in a standard library associated with the runtime framework when the customized class corresponding to the requested class is not included in the customized library; and
   automatically load the standard class corresponding to the requested class to implement the application using the runtime framework.

12. The system of claim 11, wherein the one or more processors are further operable to:
   selectively identify one of the enhanced class or standard class;
   identify a path to the selectively identified one of the enhanced class or standard class; and
   automatically load the selectively identified one of the enhanced class or standard class.

13. The system of claim 9, wherein the application framework comprises a Java Runtime Environment.

14. The system of claim 9, wherein the customized library contains more than one enhanced class.

15. The system of claim 9, wherein the one or more processors are further operable to return an exception if the enhanced class residing in the customized library cannot be located.

16. The system of claim 9, wherein the one or more processors are further operable to automatically load at least one other class associated with the enhanced class when the enhanced class is automatically loaded.

17. The software of claim 3, wherein the standard library is stored in a decoupled location from the customized library.

18. The software of claim 1, wherein the customized framework starter specifies at least one location in the customized library as a primary path to identify the path to the customized class.

19. The system of claim 11, wherein the standard library is stored in a decoupled location from the customized library.

20. The system of claim 1, wherein the customized framework starter specifies at least one location in the customized library as a primary path to identify the path to the customized class.

* * * * *